United States Patent
Swora et al.

(10) Patent No.: US 6,515,068 B1
(45) Date of Patent: Feb. 4, 2003

(54) TWO-COMPONENT COATING AGENT

(75) Inventors: Dietmar Swora, Holzwickede (DE); Jochen Schilbach, Essen (DE)

(73) Assignee: Westdeutsche Farbengesellschaft Bruche & Co. GmbH & Co. KG, Essen (DE)

( * ) Notice: Subject to any disclaimer, the term of this patent is extended or adjusted under 35 U.S.C. 154(b) by 0 days.

(21) Appl. No.: 08/545,629

(22) PCT Filed: May 9, 1994

(86) PCT No.: PCT/EP94/01478
§ 371 (c)(1),
(2), (4) Date: Nov. 29, 1995

(87) PCT Pub. No.: WO94/26799
PCT Pub. Date: Nov. 24, 1994

(30) Foreign Application Priority Data

May 11, 1993 (DE) ............................... 43 15 593

(51) Int. Cl.$^7$ ............... C08J 3/07; C08J 3/05; C08J 3/03; C08J 3/02
(52) U.S. Cl. ............ 524/556; 252/182.24; 252/182.28; 252/182.29; 524/560; 524/539; 524/591; 524/599; 524/601; 524/832; 524/839; 524/845; 528/75; 528/80; 528/83
(58) Field of Search ................ 524/556, 560, 524/591, 599, 601, 832, 839, 845, 539; 528/75, 80, 83; 252/182.24, 182.28, 182.29

(56) References Cited

U.S. PATENT DOCUMENTS

| | | | |
|---|---|---|---|
| 2,968,575 A | * 1/1961 | Mallonee | 524/839 |
| 3,213,049 A | 10/1965 | Heiss | 524/871 |
| 4,029,585 A | * 6/1977 | Dettre et al. | 428/421 |
| 4,396,738 A | 8/1983 | Powell | 524/228 |
| 4,594,374 A | * 6/1986 | Stahl et al. | 523/501 |
| 5,200,489 A | 4/1993 | Jacobs | 528/49 |
| 5,252,696 A | * 10/1993 | Laas et al. | 528/49 |
| 5,380,792 A | * 1/1995 | Renk | 524/840 |

FOREIGN PATENT DOCUMENTS

| | | |
|---|---|---|
| BE | 660 666 | 3/1965 |
| DE | 1 595 685 | 8/1969 |
| EP | 0 358 979 | 3/1990 |
| EP | 0 486 881 | 5/1992 |

OTHER PUBLICATIONS

W. Kubitza, *Waessrige Zweikomponenten–Polyurethan–Reaktivsysteme*, Forschung Entwicklung, 97. Jahrgang Mar. 1991.

G.W. Wecker, *Polyurethane, Klarstuffe Handbuch*, 7, PUR–Anstrichstoffe und Beschichtungen, pp. 599 through 603 (1993).

* cited by examiner

Primary Examiner—Rabon Sergent
(74) Attorney, Agent, or Firm—Herbert Dubno; Jonathan Myers

(57) ABSTRACT

The invention concerns a two-component coating agent with a) a water dilutable binder component of a polyester resin base and/or polyacrylate resin base, whereby the polyester and/or polyacrylate resin has a content of hydroxyl groups of 2.5 to 8% by weight OH and b) an aqueous organic polyisocyanate component of at least one polyisocyanate with free isocyanate groups which is prepared ready for use for a limited time by the stirring of the polyisocyanate component b) into the binder component a) and hardens by cross-linking of the binder component with the polyisocyanate to the binder components according to the invention are provided as aqueous emulsions of a water insoluble carboxylate-free and sulfanate-free polyester resin and/or polyacrylate resin, whereby the emulsion is produced with the aid of an emulsifier added to the polyester or polyacrylate resin. The subject of the invention is, further, a process for producing the water-dilutable binder component a).

4 Claims, No Drawings

TWO-COMPONENT COATING AGENT

DESCRIPTION

The invention relates to a two-component coating agent with a) a water-dilutable binder component based upon polyester resin and/or polyacrylate resin whereby the polyester resin and/or polyacrylate resin has a hydroxyl group content of 2.5 to 8% by weight OH, and b) a liquid organic polyisocyanate component of at least one polyisocyanate with free isocyanate groups, which by stirring of the polyisocyanate component b) into the binder component a) is prepared for use for a limited time and hardens by cross-linking of the binder component with the polyisocyanate.

The water dilutable two-component coating agent known from EP 0 358 979 A2, from which the invention starts, contains as the binder component, polymers with sulfonate groups and/or carboxylate groups. In the production of these polymers, monomers are used which contain carboxylic acid and/or sulfonic acid groups. By neutralization of the acid groups with inorganic bases or amines, a water solubility or dispersibility of the polymer is achieved. It has been found, however, that the neutralizing agent had a negative influence upon the water resistance, the weathering resistance, the corrosion prevention and the drop time of the coating agent.

Further from DE-OS 15 95 685 a process for producing modified aqueous polymer dispersions is known, in which an aqueous dispersion of polymers or mixed polymers with a reaction product having a free NCO group of higher molecular weight in a compound with at least two active hydrogen atoms can be reacted with an excess of polyisocyanate. The reaction product having the free NCO groups is stirred into the aqueous polymer dispersion. The mixture can stand for a period of three to ten days until the content of free NCO groups drops to zero. The result is a stable chemically fully reacted dispersion which can be diluted with water and used as a coating agent and impregnating agent, preferably as a finishing (sizing) agent in the textile field, usable as a single component. For the development of chemically cross-linking two component coating agents, these teachings have not been effective.

The invention has as its object an aqueous two-component coating agent of the type described initially which affords good water resistance and weathering resistance.

To achieve this object, the invention teaches that the binder components be provided as aqueous emulsions of a water-insoluble carboxylate-free and sulfonate-free polyester and/or polyacrylate resin, whereby the emulsions are formed by addition of an emulsifier to the polyester or polyacrylate resin. The hydroxyl group content of the polyester resin or polyacrylate resin is preferably in the range of 4.5 to 8% by weight OH. The NCO/OH equivalents ratio can be set in the range of 0.8:1 to 3:1 and preferably lies at 1.5:1. The subject of the invention is also a method of making the water-dilutable binder components for a two-component coating agent hardenable with polyisocyanate as previously described.

According to the invention, polyester resins and/or polyacrylate resins are used as binder components which are dissolved in organic solvents as are known from solvent-containing lacquer technology. The solids content lies in the range of 70 to 100 weight %, preferably between 80 and 90 weight %, the balance organic solvent. The polyester resins or polyacrylate resins have a viscosity of 1000 to 11000 mPa s/23° C. as measured by rotation viscosimeter. The polyester resin and/or polyacrylate resins are introduced in their water insoluble form, carboxylate-free and sulfonate-free, in aqueous emulsions whereby the emulsions are produced with the aid of emulsifiers added to the polyester resins and/or polyacrylate resins. As emulsifiers, anionically-active, non-ionic and cationically-active emulsifiers are suitable as are customarily used for the production of synthetic resins and binders by polymerization and for example as basis emulsifiers for all kinds of emulsion polymerization or as coemulsifiers for the stabilization of polymer dispersions.

The amounts of emulsifier added lie between 0.1 to 10 weight % based upon the solvent-containing form of the polyester resin or polyacrylate resin. After addition of the emulsifier to the polyester resin or polyacrylate resin, a dilution is effected with water so that a stable emulsion results with a solids content (content of polyester resin and/or polyacrylate resin) of preferably 25 to 60% by weight. For producing the ready-for-use coating agent, the polyisocyanate components are stirred into the described emulsion, whereby the polyisocyanate components are emulsified. The content of free NCO groups of the polyisocyanate component is in the range of 8 to 32% by weight based upon the solids of the component. The viscosity amounts to 40 to 9000 mPa s/23° C. (measured in the rotation viscosimeter). Where required, small amounts of an inert solvent can be incorporated in the polyisocyanate component to improve the incorporation of the polyisocyanate component b) in the binder component a). The result is high quality cross-linked films which are not inferior with respect to their characteristics to the coatings known in the organic lacquer field. Presently, the emulsifiers have no negative effect upon the film characteristics.

The two-component coating contained according to the invention is suitable for coatings of all kinds, impregnation and painting. It is self-understood that the usual auxiliaries and additives of lacquer technology can be added to the binder component. These include especially defoaming agents, flow enhancers, pigments, dispersion-promotion agents for pigment distribution and the like.

Table 1 shows in Examples A to F without limitation of the teachings according to the invention, suitable compositions for a binder component which can be introduced as a reaction component of a two-component coating agent. As a polyacrylate resin, a resin (a Johncryl 507, Johnson polymer) dissolved in butylacetate known from solvent-containing lacquer practice, is introduced, whereby the solids content is previously concentrated to 85 weight %, balance solvent, by solvent distillation. As the polyester resin, there is also used a polyester resin known from the solvent-containing lacquer practice, i.e. a resin (Synthoester HD 170, Synthopol Chemie) dissolved in butyl acetate in which the solids content amounted to 80% by weight, balance solvent. Commercially-available emulsifiers are added to the polyester resin or poly-acrylate resin as indicated in the given amounts: arylpolyglycolether (emulsifier WNS, Bayer), 2,4,7,9-tetramethyl-5 decin-4,7-diol (SURFYNOL 104, Air Products), sorbitan ester (DISPONIL SMO, Henkel) and ricinus oil ethoxylate.

Thereafter the emulsion can be adjusted as required for the purposes of use by the addition of the usual auxiliaries and additives of lacquer technology, especially pigments and defoaming agents. Also a further dilution with water can be effected.

The binder components are available in the form of an aqueous emulsion. Into the emulsion a liquid organic polyisocyonate component with at least one polyisocyanate with free isocyanate groups is emulsifyingly stirred. The mixture is ready for use for a limited time and hardens with a cross-linking reaction. High quality cross-linked films result as are known from organic lacquer practice. The water resistance of the coating agent is provided already after four hours.

EXAMPLE 1

From the aqueous emulsion A given in Table 1, a binder component of the following composition is produced:

48.0 parts emulsion A 28.0 parts titanium dioxide rutile (R KB-4, Bayer AG)

0.2 parts defoamer (Byk 034, the firm Byk Wesel).

The mixture is predispersed with a dissolver, then homogenized for 15 minutes in a bead mill and then further diluted with 23.8 parts of distilled water.

After addition of 15.9 parts polyisocyanate (Tolunate HDT 90, Rhone Poulenc) one obtains a two-component lacquer with a working duration in excess of three hours.

EXAMPLE 2

The aqueous emulsion C given in Table 1 is worked up to a binder component with the following composition:

52.0 parts emulsion C 28.0 parts titanium dioxide rutile® KG-4, Bayer AG)

0.1 parts defoamer (Byk 034 of the firm Byk Wesel)

0.1 parts wetting agent (Fluorad FC 129, 3M).

The mixture was predispersed with a dissolver, then homogenized for 15 minutes in a bead mill and finally diluted with 19.8 parts of distilled water.

After the addition of 19.3 parts of polyisocyanate (Desmodur VP LS 2550, Bayer AG), one obtains a two-component lacquer workable for over five hours.

The lacquers described in Examples 1 and 2 are brought with distilled water to a run-out time of 45 sec according to German Industrial Standard 53211-4 and are applied in a coating thickness of 50 μm to glass plates. The hardened lacquer has the characteristics given in Table 2.

TABLE 1

|  | A | B | C | D | E | F |
|---|---|---|---|---|---|---|
| Polyacrylate Resin 85% Butylacetate OH-Content 4.5% | 69 | 59 |  | 49 | 29 | 10 |
| Polyester Resin 80% Butylacetate OH-Content 5% | — | 10 | 69 | 20 | 40 | 50 |
| Arylpolyglycol ether | 1 | 1 | 1 | 1 |  |  |
| 2, 4, 7, 9-Tetra methyl-5-decine-4,7-Diol | 0.3 | 0.3 | 0.3 | 0.3 | 0.5 | 0.5 |
| Sorbitan ester | 0.5 | 0.5 |  |  |  |  |
| Ricinus oil ethoxylate |  |  | 0.8 | 0.8 | 2.5 | 2.8 |
| Distilled water | 29.2 | 29.2 | 28.9 | 28.9 | 28 | 27.7 |

TABLE 2

| Characteristics | Example 1 | Example 2 |
|---|---|---|
| Brightness according to German Industrial Standard 67530 (incidence angle 20°) | 88% | 79% |
| Pendulum hardness according to German Industrial Standard 53157 measured at room temperature after 1 day | 44 sec | 48 sec |
| measured at room temperature 7 days | 93 sec | 98 sec |
| Solvent resistance after 14 days, measured at room temperature Super gasoline lead-free | Good | Good |
| Methoxypropylacetate | Good | Good |
| Test gasoline | Very Good | Very Good |

What is claimed is:

1. A process for producing a water-dilutable binder, having hydroxyl groups and after an addition of a liquid organic polyisocyanate component with free NCO-groups in an amount which corresponds to a proportion of NCO/OH of 0.8:1 to 3:1, which is ready to be used as an organic lacquer coating agent and which after being applied to a substrate hardens into a hard film due to crosslinking reactions, consisting essentially of the following steps:

a) concentrating a binder which consists of a non-water-soluble, carboxylate and sulfonate free polyester resin and/or polyacrylate resin with a content of hydroxyl groups of 2.5 to 8% by weight OH and an organic solvent to a content of solids of 80 to 90% by weight, the balance being the organic solvent to form a solvent-containing polyester and/or polyacrylate resin;

b) adding to the concentrate produced in step a) an emulsifier in an amount of 0.1 to 10% by weight of the solvent-containing polyester and/or polyacrylate resin; and c) subsequently to step (b), blending water with the solvent-containing polyester and/or polyacrylate resin to create the water-dilutable binder as a storage-stable emulsion, capable of blending with the polyisocyanate component with free NCO groups prior to use.

2. The process according to claim 1, whereby pigments are added to the emulsion.

3. The process according to claim 1, whereby the emulsion is further diluted with water prior to blending with the polyisocyanate component.

4. The process according to claim 1 wherein the non-water-soluble, carboxylate and sulfonate free polyester resin and/or polyacrylate resin with a content of hydroxyl groups has an OH group content of 4.5 to 8% by weight.

* * * * *